(12) United States Patent
Da Palma et al.

(10) Patent No.: US 9,311,420 B2
(45) Date of Patent: Apr. 12, 2016

(54) CUSTOMIZING WEB 2.0 APPLICATION BEHAVIOR BASED ON RELATIONSHIPS BETWEEN A CONTENT CREATOR AND A CONTENT REQUESTER

(75) Inventors: William V. Da Palma, Coconut Creek, FL (US); Victor S. Moore, Lake City, FL (US); Wendi L. Nusbickel, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1952 days.

(21) Appl. No.: 11/766,255

(22) Filed: Jun. 21, 2007

(65) Prior Publication Data
US 2008/0320079 A1    Dec. 25, 2008

Related U.S. Application Data

(63) Continuation-in-part of application No. 11/765,900, filed on Jun. 20, 2007, which is a continuation-in-part of application No. 11/765,928, filed on Jun. 20, 2007, which is a continuation-in-part of application No. 11/765,962, filed on Jun. 20, 2007.

(51) Int. Cl.
*G06F 17/30* (2006.01)
*G06Q 30/02* (2012.01)
(Continued)

(52) U.S. Cl.
CPC ............ *G06F 17/3089* (2013.01); *G06Q 30/02* (2013.01); *G10L 15/30* (2013.01); *H04L 67/02* (2013.01); *H04L 67/06* (2013.01); *H04L 67/306* (2013.01); *G10L 15/32* (2013.01)

(58) Field of Classification Search
CPC .... G06F 17/3089; G06Q 30/02; G10L 15/32; G10L 15/30; H04L 67/302; H04L 67/02

USPC ......................................... 715/234, 243, 254
See application file for complete search history.

(56) References Cited

U.S. PATENT DOCUMENTS 6,269,336 B1    7/2001    Ladd et al.
6,314,402 B1    11/2001    Monaco et al.
(Continued)

FOREIGN PATENT DOCUMENTS

WO    2005011921    12/2005
WO    2005119521 A2    12/2005

OTHER PUBLICATIONS

Takami et al., "A study on the architecture and voice dialog scheme for a personal Web service in a ubiquitous communication environment," IEEE, Jun. 2006, p. 398-401.*
(Continued)

*Primary Examiner* — Kyle Stork
(74) *Attorney, Agent, or Firm* — Patents on Demand P.A.; Brian K. Buchheit; Scott M. Garrett (57) ABSTRACT

The present invention discloses a solution for developer customization of Web 2.0 applications based on relationships between a content creator and a content requester. In the solution, Web 2.0 content can be received from a content creator. One or more creator established customizations can also be received where the customizations are each a set of one or more users. In the method, a communication can be established with a user who requests the Web 2.0 content. It can be determined that the user is a member of a set specified by the content creator. The customization associated with the set can be applied. Web 2.0 content as modified by the customization can be served to the user. In one embodiment, users can also establish customizations, which are also applied to the served Web 2.0 content.

12 Claims, 4 Drawing Sheets

(51) Int. Cl.
*G10L 15/30* (2013.01)
*H04L 29/08* (2006.01)
*G10L 15/32* (2013.01)

(56) References Cited

U.S. PATENT DOCUMENTS

| | | | |
|---|---|---|---|
| 6,324,511 | B1 | 11/2001 | Kiraly et al. |
| 6,442,577 | B1* | 8/2002 | Britton et al. ............ 715/230 |
| 6,636,831 | B1 | 10/2003 | Profit, Jr. et al. |
| 6,801,604 | B2 | 10/2004 | Maes et al. |
| 6,865,599 | B2 | 3/2005 | Zhang |
| 7,047,196 | B2 | 5/2006 | Calderone et al. |
| 7,143,148 | B1 | 11/2006 | Hickman et al. |
| 7,334,050 | B2 | 2/2008 | Zondervan et al. |
| 7,581,166 | B2 | 8/2009 | Renger et al. |
| 7,631,104 | B2 | 12/2009 | Da Palma et al. |
| 7,669,123 | B2* | 2/2010 | Zuckerberg et al. ........ 715/273 |
| 7,673,017 | B2 | 3/2010 | Kim et al. |
| 7,725,492 | B2* | 5/2010 | Sittig et al. ............ 707/784 |
| 7,788,260 | B2* | 8/2010 | Lunt et al. ............ 707/727 |
| 7,797,256 | B2* | 9/2010 | Zuckerberg et al. ........ 705/319 |
| 7,809,805 | B2* | 10/2010 | Stremel et al. ........... 709/219 |
| 7,827,208 | B2* | 11/2010 | Bosworth et al. ......... 707/802 |
| 7,827,265 | B2* | 11/2010 | Cheever et al. ........... 709/223 |
| 2002/0010756 | A1 | 1/2002 | Oku |
| 2002/0052747 | A1 | 5/2002 | Sarukkai |
| 2002/0098864 | A1 | 7/2002 | Mukai et al. |
| 2002/0156842 | A1* | 10/2002 | Signes et al. ........... 709/203 |
| 2003/0055884 | A1 | 3/2003 | Yuen et al. |
| 2003/0088421 | A1 | 5/2003 | Maes et al. |
| 2003/0139928 | A1 | 7/2003 | Krupatkin et al. |
| 2003/0177010 | A1 | 9/2003 | Locke |
| 2005/0132056 | A1 | 6/2005 | Creamer et al. |
| 2006/0004700 | A1 | 1/2006 | Hofmann et al. |
| 2006/0015335 | A1 | 1/2006 | Vennelakanti et al. |
| 2006/0122836 | A1 | 6/2006 | Cross et al. |
| 2006/0195328 | A1 | 8/2006 | Abraham et al. |
| 2007/0078884 | A1* | 4/2007 | Ott et al. ............. 707/102 |
| 2007/0185927 | A1* | 8/2007 | Chess et al. ............ 707/203 |
| 2007/0213980 | A1* | 9/2007 | Danner et al. ........... 704/231 |
| 2008/0010341 | A1* | 1/2008 | Curtis et al. ........... 709/204 |
| 2008/0010387 | A1* | 1/2008 | Curtis et al. ........... 709/246 |
| 2008/0010609 | A1* | 1/2008 | Curtis et al. ........... 715/810 |
| 2008/0033739 | A1* | 2/2008 | Zuckerberg et al. ......... 705/1 |
| 2008/0040661 | A1* | 2/2008 | Curtis et al. ........... 715/243 |
| 2008/0046976 | A1* | 2/2008 | Zuckerberg ............ 726/4 |
| 2008/0086689 | A1 | 4/2008 | Berkley et al. |
| 2008/0177831 | A1* | 7/2008 | Li ................... 709/204 |
| 2008/0242221 | A1* | 10/2008 | Shapiro et al. .......... 455/3.06 |
| 2008/0244020 | A1* | 10/2008 | Dolan ................ 709/206 |
| 2008/0319742 | A1 | 12/2008 | Da Palma et al. |
| 2008/0319757 | A1 | 12/2008 | Da Palma et al. |
| 2008/0319758 | A1 | 12/2008 | Da Palma et al. |
| 2008/0319759 | A1 | 12/2008 | Da Palma et al. |
| 2008/0319760 | A1 | 12/2008 | Da Palma et al. |
| 2008/0319762 | A1 | 12/2008 | Da Palma et al. |
| 2008/0320079 | A1 | 12/2008 | Da Palma et al. |
| 2008/0320443 | A1 | 12/2008 | Da Palma et al. |

OTHER PUBLICATIONS

Huang, C.M., et al., "Phone-Web: Accessing WWW using a telephone set", World Wide Web, vol. 2, No. 3, pp. 161-178, 1999.
Freier, J., et al., "WebViews: Accessing Personalized Web Content and Services", Proc. of 10th Int'l Conf. on WWW, Hong Kong, pp. 576-586, 2001.
Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.
Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.
Capra III, R.G., et al., "Mobile refinding of web information using a voice interface: an exploratory study", Proc. of 2005 Latin American Conf. on Human-computer interaction, Cuernavaca, Mexico, pp. 88-99, 2005.
Chang, S.E., et al., "The implementation of a secure and pervasive multimodal Web system architecture", Inf. and Software Tech., vol. 48, No. 6, pp. 424-432, Jun. 2006.
Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.
O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.
"Bliki", [online] Wikipedia [retrieved Feb. 23, 2007] retrieved from the Internet: <http://len.wikipedia.org/wiki/Bliki>.
"Cyn.in," [online] Cynapse [retrieved Feb. 23, 2007] retrieved from the Internet: <http://www.cynapse.com/cynin>.
DeMaria, M.J., "Searching for the Right Words", Network Computing, vol. 17, No. 22, pp. 26, 28, Oct. 26, 2006.
"Enterprise Bliki," [online] Wikipedia, [retrieved Feb. 23, 2007] retrieved from the Internet: http://en.wikipedia.org/wiki/Enterprise_bliki>.
Fielding, R., et al., "Principled Design of the Modern Web Architecture," ACM Trans. on Internet Technology, vol. 2, No. 2, May 2002, pp. 115-150.
Kolias, et al., "A Pervasive Wiki Application Based on VoiceXML," ACM, Petra '08, Jul. 15-19, 2008.
Leseney, T., "Push-to-blog", Siemens AG, Oct. 2004.
Nottingham, M., et al., "Request for Comments (RFC) 4287: The Atom Syndication Format," The Internet Society, Dec. 2005, 43 pages.
Schaffert, et al., "IkeWiki: A Semantic Wiki for Collaborative Knowledge Management," IEEE Int'l. Workshops on Enabling Technologies: Infrastructure for Collaborative Enterprises, 2006.
"SuiteTwo: Features", [online] Moveable Type, 2006 [retrieved Feb. 23, 2007] retrieved from the Internet: < http://suitetwo.com/features>.
"Wiki," [online] Wikipedia [retrieved Feb. 23, 2007] retrieved from the Internet: <http://en.wikipedia.org/wiki/Wiki>.
Takami, et al., "A Study on the Architecture and Voice Dialog Scheme for a Personal Web Service in a Ubiquitous Communication Environment," IEEE, pp. 398-401, Jun. 2006.

* cited by examiner

FIG. 5

CUSTOMIZING WEB 2.0 APPLICATION BEHAVIOR BASED ON RELATIONSHIPS BETWEEN A CONTENT CREATOR AND A CONTENT REQUESTER

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765,928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of Web 2.0 applications and, more particularly, to customizing Web 2.0 application behavior based on relationships between a content creator and a content requester.

2. Description of the Related Art

Web 2.0 applications promote collaboration and information sharing among large groups of users. The fundamental principles of Web 2.0 applications grant end-users (those users other than the originator) the privileges to read, write, and update existing applications, actions traditionally restricted to application developers. Additionally, Web 2.0 applications depend upon the collaborative effort of end-users to provide new content and revise existing content. For example, the entries of WIKIPEDIA, a Web 2.0 encyclopedia application, are created and revised by end-users, allowing information to be added and revised as it becomes available.

What is not possible with Web 2.0 applications today is a way to personalize a created Web 2.0 application so that it behaves differently depending on who is accessing it. For example, a user cannot currently create a social networking page (e.g., MYSPACE.COM) so that different content is presented to a specific user, such as a best friend, than that presented to the general public. Neither can a user create a BLOG or a WIKI so that it permits different users to receive different content. Personalizing Web 2.0 applications in a requester specific manner as used herein does not refer to password protecting or otherwise securing content so that it is unavailable to unauthorized requesters, but instead refers to customizing content based on a requester identity which can occur in a manner transparent to the requester. Conventional Web 2.0 applications do not currently support these requester specific customizations.

SUMMARY OF THE INVENTION

The present invention discloses a solution for customizing Web 2.0 application behavior based on relationships between a content creator and a content requester. The established relationships can be based on a category or group of a content requester or an actual identity of a requester. More specifically, when a content creator establishes a Web 2.0 entry (e.g., a WIKI, BLOG, FOLKSONOMY, social networking entry, etc.) they can establish customizations specific to one or more potential requesters. When a generic requester accesses the Web 2.0 entry, default content can be provided. When one of the tailored requesters obtains the Web 2.0 entry, the customizations can be applied to override default content which results in non-default content being automatically presented. In various configurations, the Web 2.0 application can be accessed through multiple modalities including a Web based interface and a voice response interface.

For example, the Web 2.0 application can be a voicemail application having customizations established for a manager, family, friends, and a spouse. When the manager accesses the voicemail, he/she can receive an announcement indicating that the content creator is busy on a project and is unable to be disturbed. Family can receive a message saying the content creator is unavailable but will attend a family gathering that weekend. Friends can receive a message indicating the content creator is at the beach until 4 p.m. and would welcome company. A spouse can receive a message that indicates that the content creator can be contacted by their mobile phone and that they should be home by 5 p.m.

The present invention can be implemented in accordance with numerous aspects consistent with the material presented herein. For example, one aspect of the present invention can include a method for customizing Web 2.0 applications based on relationships between a content creator and a content requester. In the method, Web 2.0 content can be received from a content creator. One or more creator established customizations can also be received, where the customizations are each associated with a set of one or more users. In the method, a communication can be established with a user who requests the Web 2.0 content. It can be determined that the user is a member of a set specified by the content creator. The customization associated with the set can be applied. Web 2.0 content, as modified by the customization, can be served to the user. In one embodiment, users can also establish customizations that are to be applied to themselves.

Another aspect of the present invention can include a Web 2.0 application exhibiting variable behavior based on the relationships between a content creator and a content requester. The Web 2.0 application can include default Web content and creator established customizations. The default Web content can be established by a content creator and can be stored in a machine readable medium. The default Web content can be served to remotely located requesters by a Web 2.0 server. The creator established customizations can be stored in a machine readable medium. Each creator established customization can be associated with at least one user and can replace a portion of the default Web content when a Web 2.0 server serves Web content to a user associated with the related customization.

Still another aspect of the present invention can include a service-side data storage area for Web 2.0 applications. The data store can store creator established content customizations for a Web 2.0 application. Different ones of the customizations can be associated with defined sets of one or more content requesters. When the Web 2.0 application is served to a user by a Web 2.0 server, an identity of the user can be determined. This identity can be compared against the defined sets of content requesters and customizations can be applied when matches are found. That is, the served Web 2.0 application can serve customized content where the customizations override default content which is served to default users.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
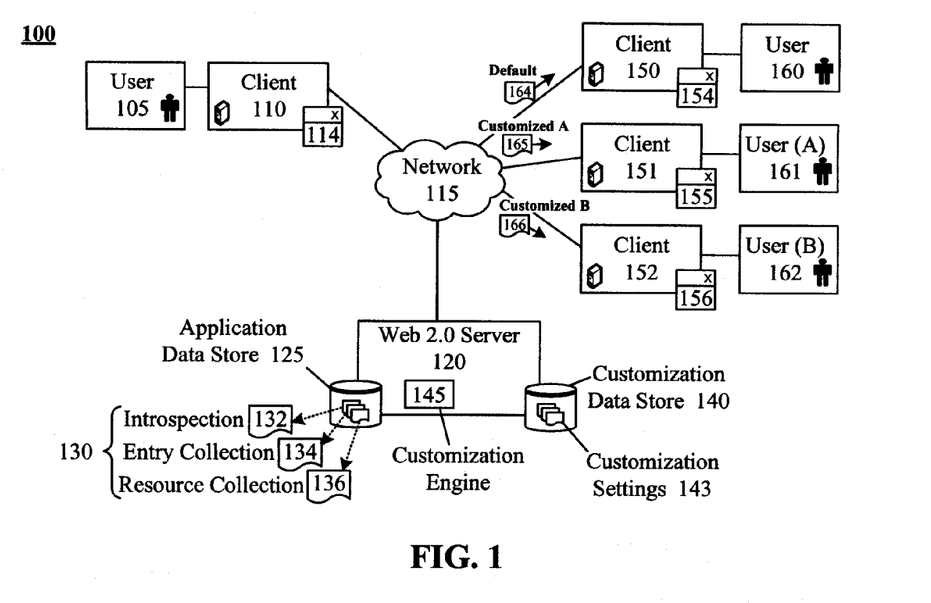
FIG. 1 is a schematic diagram of a system that provides for customization of Web 2.0 applications based on relationships between a content creator and a content requester in accordance with an embodiment of the inventive arrangements disclosed herein.

FIG. 1 is a schematic diagram of a system 100 that provides for customization of Web 2.0 applications based on relationships between a content creator and a content requester in accordance with an embodiment of the inventive arrangements disclosed herein. In system 100, a user 105 can create Web 2.0 content 130 along with one or more user 160-162 specific customizations 143. When each user 160-162 accesses the content created by user 105, any user specific customizations can be automatically applied to received content 164-166. Each of the users 105, 160-162 can utilize a client 110, 150-152 having a browser 114, 154-156 to interact over network 115 with a Web 2.0 server 120, which manages the Web 2.0 content 130 and customizations 143.

To illustrate, user 105 can establish default 164 content for a Web 2.0 application. User 105 can also establish a first customization (Customized A) which is specific to User A (user 161) and can establish a second customization (Customized B) which is specific to User B (user 162). Each user 160-162 accessing server 120 can identify themselves, such as by logging into the server 120. Once a user's identity is known, customizations can be applied to content provided to these users 160-162. Thus, user 160 receives default content 164, user 161 receives customized content 165, and user 162 receives customized content 166 from server 120, even though each user 160-162 issues an approximately identical request to server 120. In one embodiment, each user 160-162 is also permitted to establish their own customizations to be applied to themselves, which can be stored in data store 140 and handled by the Web 2.0 server 120.

Each client 110, 150-152 can be a variety of electronic devices and can use various associated communication protocols. For example, when the client 110, 150-152 is a basic computing device (e.g., a personal computer), the interface 114, 154-156 can be a browser which communicates using the appropriate Web 2.0 conventions, such as HyperText Transfer Protocol (HTTP). When the client 110, 150-152 is a telephone, the interface 114, 154-156 can be a voice browser which communicates using VoiceXML messages.

The Web 2.0 server 120 can be a WIKI server, a BLOG server, MASHUP server, a FOLKSONOMY server, a social networking server, and the like. The Web 2.0 server 120 can include an application data store 125, a customization data store 140, and a customization engine 145. The application data store 125 can contain the Web 2.0 applications that can be requested by and served to the user 105, 160-162. The application data store 125 can include Web 2.0 applications that can be represented as a set of documents 130, such as introspection documents 132, entry collection documents 134, and resource collection documents 136. These documents 130 can be written in accordance with an Atom Publishing Protocol (APP) specification. In one embodiment, one or more of the Web 2.0 applications can be speech-enabled applications capable of receiving speech input and providing speech output.

The customization engine 145 can be a software component that queries the customization data store 140 for customization settings 143 associated with the user 105 request. These customization settings 143 can be used by the customization engine 145 to modify entries of the documents 130 defining a Web 2.0 application contained in the application data store 125. Once the settings 143 are applied, the Web 2.0 server 120 can convey the customized Web 2.0 application back to the interface 114, 154-156. The customization settings 143 can be user established settings for the user's own use as well as being content creator established settings to be applied to others when they access the content.

In one contemplated embodiment, the customization data store 140 and customization engine 145 can be located on another server (not shown) communicatively linked with the Web 2.0 server 120.

In another embodiment, a middleware server (not shown) can be used as an interface for managing disparate communication systems. For example, a middleware server can be used to bridge a telephony system with a computer network system.

As used herein, presented data stores, including stores 125 and 140, can be a physical or virtual storage space configured to store digital information. Data stores 125 and 140 can be physically implemented within any type of hardware including, but not limited to, a magnetic disk, an optical disk, a semiconductor memory, a digitally encoded plastic memory, a holographic memory, or any other recording medium. Each of the data stores 125 and 140 can be a stand-alone storage unit as well as a storage unit formed from a plurality of physical devices. Additionally, information can be stored within data store 125 and 140 in a variety of manners. For example, information can be stored within a database structure or can be stored within one or more files of a file storage system, where each file may or may not be indexed for information searching purposes. Further, data stores 125 and/or 140 can utilize one or more encryption mechanisms to protect stored information from unauthorized access.

Network 115 can include any hardware/software/and firmware necessary to convey data encoded within carrier waves.

Data can be contained within analog or digital signals and conveyed though data or voice channels. Network 115 can include local components and data pathways necessary for communications to be exchanged among computing device components and between integrated device components and peripheral devices. Network 115 can also include network equipment, such as routers, data lines, hubs, and intermediary servers which together form a data network, such as the Internet. Network 115 can also include circuit-based communication components and mobile communication components, such as telephony switches, modems, cellular communication towers, and the like. Network 115 can include line based and/or wireless communication pathways.

Figure 2:
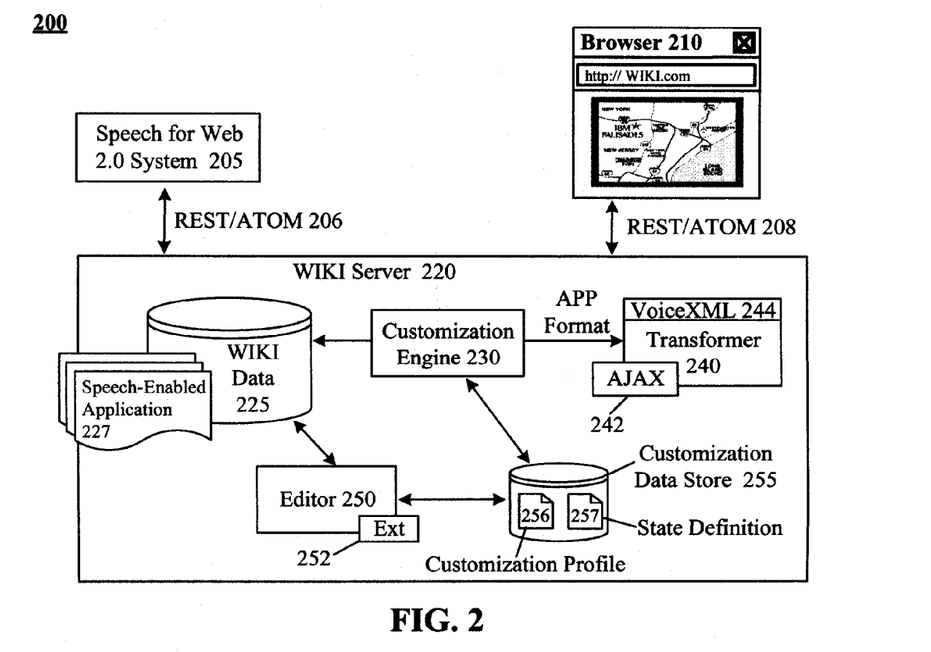
FIG. 2 is a schematic diagram illustrating a specific embodiment of a Web 2.0 server that provides customization of Web 2.0 applications based on relationships between a content creator and a content requester in accordance with an embodiment of the inventive arrangements disclosed herein.

FIG. 2 is a schematic diagram 200 illustrating a specific embodiment of a Web 2.0 server that provides customization of Web 2.0 applications based on relationships between a content creator and a content requester in accordance with an embodiment of the inventive arrangements disclosed herein. Although a WIKI server 220 is illustrated, server 220 can be any WEB 2.0 server (e.g., server 120 of system 100) including, but not limited to, a BLOG server, a MASHUP server, a FOLKSONOMY server, a social networking server, and the like.

In the system illustrated by FIG. 2, a browser 210 can communicate with WIKI server 220 via a Representational State Transfer (REST) architecture/ATOM 208 based protocol. The WIKI server 220 can communicate with system 205 via a REST/ATOM 206 based protocol. Protocols 206, 208 can include HTTP and similar protocols that are RESTful by nature as well as an Atom Publishing Protocol (APP) or other protocol that is specifically designed to conform to REST principles.

The server 220 can include a data store 225 in which applications 227, which can be speech-enabled, are stored. In one embodiment, the applications 227 can be written in a WIKI syntax contained in an APP format. 100301 The contents of the application 227 can be accessed and modified using editor 250. The editor 250 can be a standard WIKI editor having a voice plug-in or extensions 252. Modifications made to the speech-enabled application 227 via the editor 250 can be stored in customization data store 255 as a customization profile 256 and/or a state definition 257.

The customization profile 256 and state definition 257 can contain customization settings that can override entries contained within the original application 227. The contents of the customization profile 256 and/or state definition 257 can be stored as modifications to and/or deltas from the original application 227 in an APP based format. The invention is not to be construed as limited in this regard and formats other than an APP format can be used. Customizations can be related to a particular user or set of users.

The customization engine 230 can apply the contents of the customization profile 256 and/or state definition 257 to the speech-enabled application 227. Once the application 227 is customized, the customization engine 230 can convey the customized application 227 to the transformer 240.

The transformer 240 can convert WIKI syntax into standard markup for browsers. In one embodiment, the transformer 240 can be an extension of a conventional transformer that supports HTML and XML. The extended transformer 240 can be enhanced to handle JavaScript, such as AJAX. For example, resource links of application 227 can be converted into AJAX functions by the transformer 240 having an AJAX plug-in 242. The transformer 240 can also include a VoiceXML plug-in 244, which generates VoiceXML markup for voice-only clients.

Figure 3:
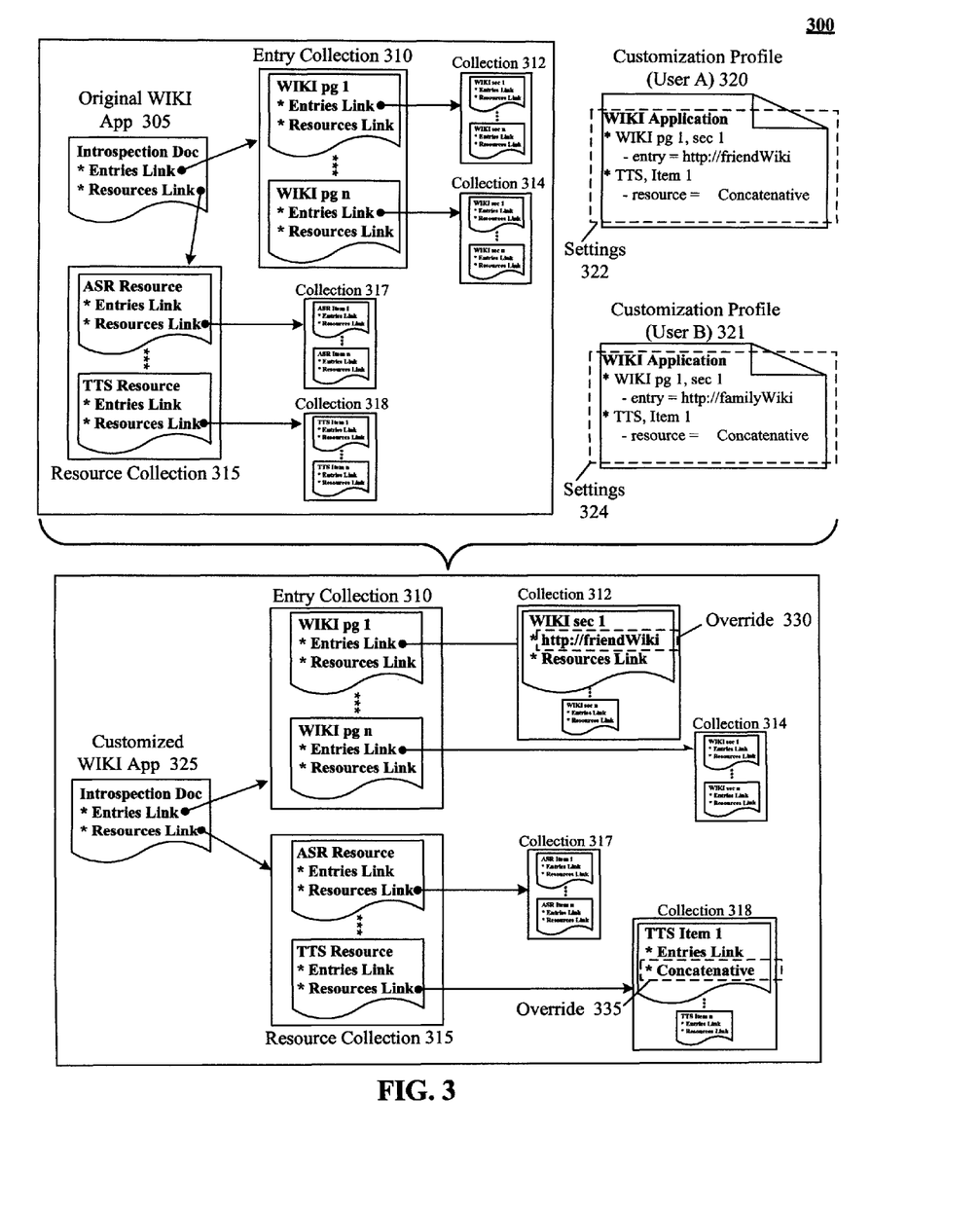
FIG. 3 is a diagram depicting an application of user-specific customization settings to a Web 2.0 application in accordance with an embodiment of the inventive arrangements disclosed herein

FIG. 3 is a diagram 300 depicting an application of user-specific customization settings to a Web 2.0 application 305 in accordance with an embodiment of the inventive arrangements disclosed herein. The application of customization settings shown in diagram 300 can be performed in the context of systems 100 and/or 200 or any other Web 2.0 system allowing user customization of Web 2.0 applications.

In diagram 300, the contents of a customization profile 320, 321 can be applied to an original WIKI application 305. Each profile 320, 321 can have different settings 322, 324, which apply to a specific WIKI requester or category of requester. For example, profile 320 can apply to a User A, who can be a friend of a content creator. Profile 321 can apply to a User B, who can be a family member of a content creator. It should be noted that although this example uses a WIKI application 305, the invention is not limited to WIKI applications and can utilize any type of Web 2.0 application.

As shown in this example, the introspection document of the original WIKI application 305 can contain links to a collection of entries 310 and a collection of resources 315. The entries 310 can specify a set of WIKI pages. Each WIKI page (entry 310) can be further decomposed into collections 312-314 having a lower level of granularity, such as WIKI page sections. The resources 315 can include speech processing resources and their particulars, such as ASR resources, TTS resources, SIV resources, VoiceXML interpreter resources, and the like. Each resource 315 can be further decomposed into configurable resource specifics 317-318, such as a speech recognition grammar (for a related WIKI page), a recognition language, and the like.

The customization profile 320, 321 can include customization settings 322, 324 for a specified Web 2.0 application, such as WIKI application 305. As shown in this example, the settings 322, 324 can define the location within the application and a value for an entry to replace at the specified location. In this example, the customization settings 322 define a Universal Resource Identifier (URI), "http://friendWiki", to replace the entry of WIKI page 1, section 1, and a definitive value, "concatenative" to replace the resource entry of TTS, Item 1.

Application of the customization settings 322, 324 to the original WIKI application 305 can result in a customized WIKI application 325. As shown in this example, the composition of the customized application 325 remains unaltered. That is, the presence and linking of the collections 310-318 are unchanged. However, the entries specified in the customization profile 320, 321 can be replaced with the values contained in the customization settings 322, 324.

To illustrate the application of the customization settings 322, 324, the modified areas have been enlarged. Section 1 of collection 312 now contains override 330, which corresponds to the value specified in the customization profile 320, 321. Likewise, collection 318 now contains override 335.

As shown in this example, the customization settings 322, 324 can contain values that can modify the performance of a speech processing system. In this example, override 335 specifies for the speech processing system to use a concatenative method for performing text-to-speech (TTS) operations. It should be emphasized that this level of control and customization for speech processing functions has traditionally been reserved only for developers of speech-enabled applications and has not been accessible to end-users.

It should also be noted that the application of customization settings 322, 324 shown in this example can also apply to settings contained within a state definition file, which can also contain similar customization settings.

Figure 4:
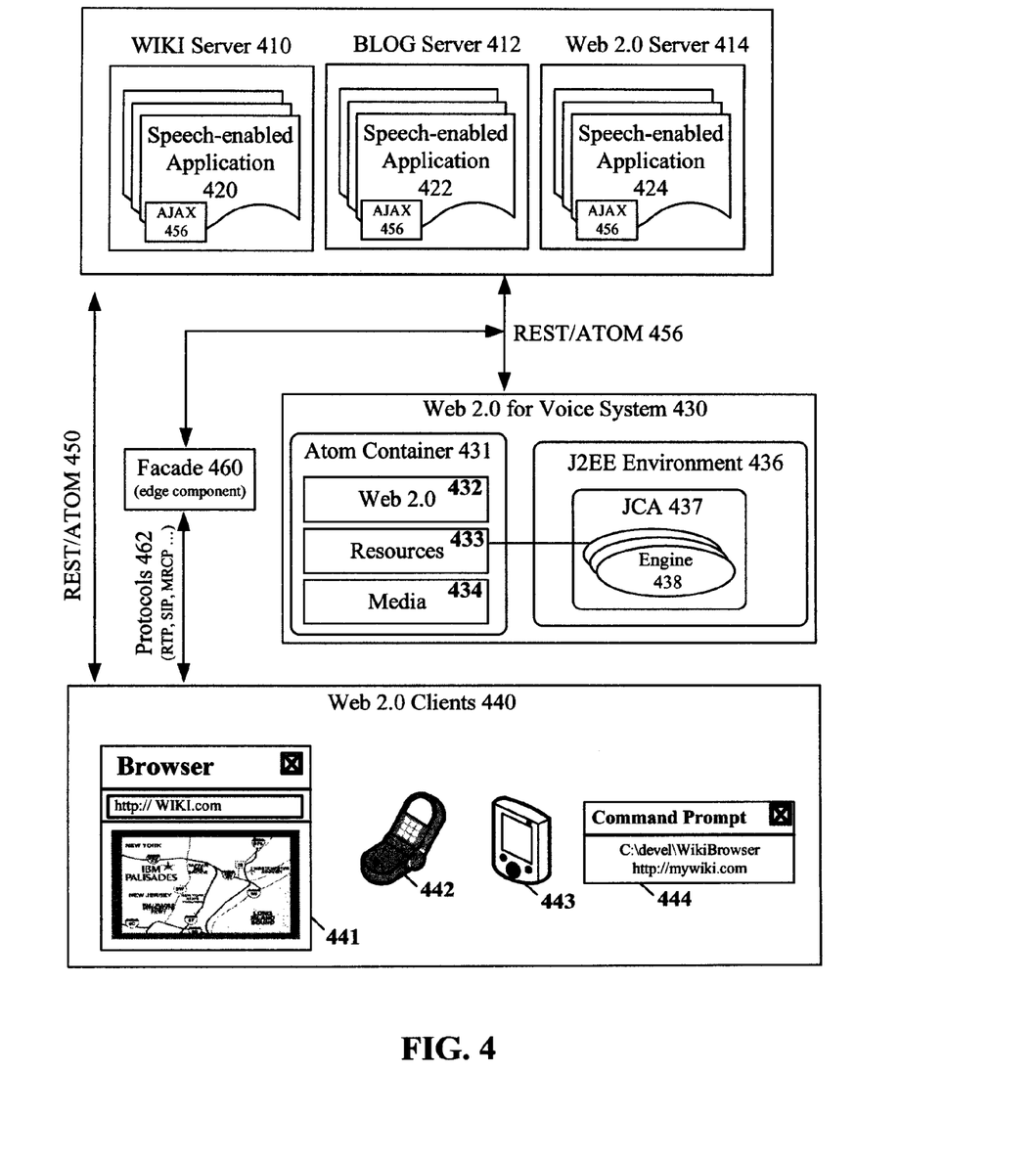
FIG. 4 is a schematic diagram showing a WIKI server adapted for communications with a Web 2.0 for voice system in accordance with an embodiment of the inventive arrangements disclosed herein.

FIG. 4 is a schematic diagram of a system 400 for a Web 2.0 for voice system 430 in accordance with an embodiment of the inventive arrangements disclosed herein. System 400 can be an alternative representation and/or an embodiment for the system 100 of FIG. 1 or for a system that provides approximately equivalent functionality as system 100 utilizing Web 2.0 concepts to provide speech processing capabilities.

In system 400, Web 2.0 clients 440 can communicate with Web 2.0 servers 410-414 utilizing a REST/ATOM 450 protocol. The Web 2.0 servers 410-414 can serve one or more speech-enabled applications 420-424, where speech resources are provided by a Web 2.0 for Voice system 430. One or more of the applications 420-424 can include AJAX 456 or other JavaScript code. In one embodiment, the AJAX 456 code can be automatically converted from WIKI or other syntax by a transformer of a server 410-414.

Communications between the Web 2.0 servers 410-414 and system 430 can be in accordance with REST/ATOM 456 protocols. Each speech-enabled application 420-424 can be associated with an atom container 431, which specifies Web 2.0 items 432, resources 433, and media 434. One or more resource 433 can correspond to a speech engine 438.

The Web 2.0 clients 440 can be any client capable of interfacing with a Web 2.0 server 410-414. For example, the clients 440 can include a Web or voice browser 441 as well as any other type of interface 444, which executes on a computing device. The computing device can include a mobile telephone 442, a mobile computer 443, a laptop, a media player, a desktop computer, a two-way radio, a line-based phone, and the like. Unlike conventional speech clients, the clients 440 need not have a speech-specific interface and instead only require a standard Web 2.0 interface. That is, there are no assumptions regarding the client 440 other than an ability to communicate with a Web 2.0 server 410-414 using Web 2.0 conventions.

The Web 2.0 servers 410-414 can be any server that provides Web 2.0 content to clients 440 and that provides speech processing capabilities through the Web 2.0 for voice system 430. The Web 2.0 servers can include a WIKI server 410, a BLOG server 412, a MASHUP server, a FOLKSONOMY server, a social networking server, and any other Web 2.0 server 414.

The Web 2.0 for voice system 430 can utilize Web 2.0 concepts to provide speech capabilities. A server-side interface is established between the voice system 430 and a set of Web 2.0 servers 410-414. Available speech resources can be introspected and discovered via introspection documents, which are one of the Web 2.0 items 432. Introspection can be in accordance with the APP specification or a similar protocol. The ability for dynamic configuration and installation is exposed to the servers 410-414 via the introspection document.

That is, access to Web 2.0 for voice system 430 can be through a Web 2.0 server that lets users (e.g., clients 440) provide their own customizations/personalizations. Appreciably, use of the APP 456 opens up the application interface to speech resources using Web 2.0, JAVA 2 ENTERPRISE EDITION (J2EE), WEBSPHERE APPLICATION SERVER (WAS), and other conventions rather than being restricted to protocols, such as media resource control protocol (MRCP), real time streaming protocol (RTSP), or real time protocol (RTP).

The Web 2.0 for Voice system 430 is an extremely flexible solution that permits users (of clients 440) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 438 can be provided from a J2EE environment 436, such as a WAS environment. This environment 436 can conform to a J2EE Connector Architecture (JCA) 437.

In one embodiment, a set of additional facades 460 can be utilized on top of Web 2.0 protocols to provide additional interface and protocol 462 options (e.g., MRCP, RTSP, RTP, Session Initiation Protocol (SIP), etc.) to the Web 2.0 for voice system 430. Use of facades 460 can enable legacy access/use of the Web 2.0 for voice system 430. The facades 460 can be designed to segment the protocol 462 from underlying details so that characteristics of the facade do not bleed through to speech implementation details. Functions, such as the WAS 6.1 channel framework or a JCA container, can be used to plug-in a protocol, which is not native to the J2EE environment 436. The media component 434 of the container 431 can be used to handle media storage, delivery, and format conversions as necessary. Facades 460 can be used for asynchronous or synchronous protocols 462.

Figure 5:
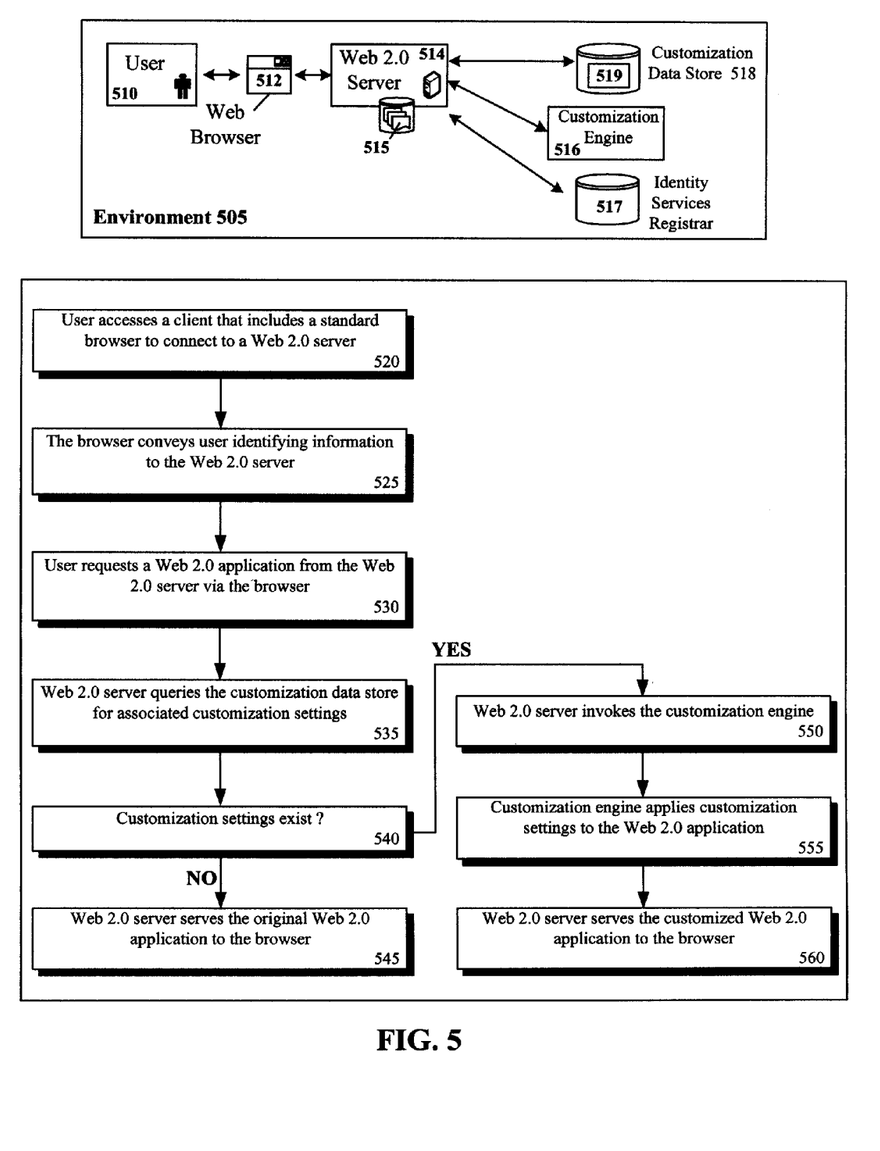
FIG. 5 is a flow diagram illustrating an environment for creating and applying user-specific customization settings to Web 2.0 applications in accordance with an embodiment of the inventive arrangements disclosed herein.

FIG. 5 is a flow diagram illustrating an environment 505 for creating and applying user-specific customization settings 519 to Web 2.0 applications 515 in accordance with an embodiment of the inventive arrangements disclosed herein. As illustrated in environment 505, an end-user 510 can use a Web browser 512 to request Web 2.0 applications 515 from a Web 2.0 server 514. In one embodiment, a user's identity can be determined using an identity services registrar 517, such as a Home Subscriber services registrar. In another embodiment, the user can log onto the Web 2.0 server 514 directly, and the server 514 can determine the user's identity from the login information. The Web 2.0 server 514 can access user-specific customizations 519 contained within a customization data store 518 and utilize a customization engine 516 to apply the settings 519 to the requested application 515. The customizations 519 can be established by a content creator or by the accessing user 510. Communication between the components illustrated in environment 505 can be conveyed over a network (not shown).

It should be noted that environment 505 and its components can be expanded to encompass speech processing capabilities for speech-enabled Web 2.0 applications, such as those illustrated in system 200 of FIG. 2.

The method of FIG. 5, which includes steps 520-560, can be performed in the context of environment 505. The method can begin in step 520, where a user can establish a connection to a Web 2.0 server by accessing a client that includes a standard Web browser. In step 525, the browser can convey information to the Web 2.0 server that identifies the user.

The user can then request a Web 2.0 application from the Web 2.0 server via the browser in step 530. In step 535, the Web 2.0 server can query the customization data store for customization settings that are associated with the identified user and requested application. The existence of customization settings can be determined in step 540. An absence of customization settings associated with the identified user and requested application can execute step 545, in which the Web 2.0 server serves the Web 2.0 application in its original format to the browser.

When customization exists, step 550 can be executed, in which the Web 2.0 server can invoke a customization engine. In step 555, the customization engine can apply the customization settings to the requested Web 2.0 application. The Web 2.0 server can then serve the customized application to the browser in step 560.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for customizing Web 2.0 applications comprising:
  receiving Web 2.0 content from a content creator, wherein the Web 2.0 content is content of a Web 2.0 application that grants end-users who are not the content creator with privileges to read, write, and update the Web 2.0 content;
  receiving at least one creator established customization which is associated with a set of at least one user, wherein the set of at least one user is specified by the content creator based on relationships between the content creator and the at least one user;
  communicating with a user accessing a Web 2.0 application associated with the Web 2.0 content;
  determining that the user is a member of the set specified by the content creator; applying the customization associated with the set;
  serving the Web 2.0 content as modified by the customization to the user, wherein end-users receiving the Web 2.0 content who are not members of the set of at least one user defined by the content creator receive the Web 2.0 content that is not modified by the customization, and wherein the user who is served the Web 2.0 content is able to modify the received Web 2.0 content with customizations to be selectively applied to a second set of end-users explicitly defined by the user based on relationships between the user and the second set of end-users; and
  querying a user customization storage area for user established customizations;
  discovering and applying at least one user established customization for the user; and serving the Web 2.0 content as modified by the customization established by the content creator and by the user established customizations to the user.

2. The method of claim 1, wherein each received customization is associated with customization markup, said customization markup referencing corresponding default markup for the Web 2.0 content, wherein the applying step replaces the corresponding default markup with the customization markup before serving the Web 2.0 content.

3. The method of claim 1, wherein the Web 2.0 application conforms to an Atom Publishing Protocol (APP) based specification, wherein the Web 2.0 application comprises an introspection document, a collection of entries, and a collection of resources each of which conforms to the APP based specification, and wherein the applied customization represents a modification to at least one of the entries and resources.

4. The method of claim 1, wherein the Web 2.0 application is a speech-enabled application, and wherein at least one speech resource used by the speech-enabled application is provided by a speech processing engine remotely located from the Web 2.0 server and remotely located from a client to which the Web 2.0 content is served.

5. The method of claim 4, wherein the applied content creator established customization is a speech processing customization that affects a manner in which the speech processing engine performs a speech processing task.

6. The method of claim 1, wherein said steps of claim 1 are steps performed automatically by at least one machine in accordance with at least one computer program having a plurality of code sections that are executable by the at least one machine, said at least one computer program being stored in a machine readable medium.

7. The method of claim 1, wherein the content creator and each user in the set of at least one user are end-users, each able to read, create, and revise the Web 2.0 content and other Web 2.0 content via the Web 2.0 application.

8. The method of claim 1, wherein the content creator is an end-user, wherein the set of at least one user comprises said user referred to as the first end-user for whom the content creator specifically established the customization referred to as the first customization, said method further comprising:
  receiving a second customization for the Web 2.0 content from the content creator, where the content creator has specifically established the second customization for a second end-user different from said user;
  communicating with the second end-user accessing the Web 2.0 application associated with the Web 2.0 content;
  applying the second customization to the second end-user; and
  serving the Web 2.0 content as modified by the second customization to the second end-user, wherein the Web 2.0 content served to the second end-user is not modified in any way by the first customization, and wherein the Web 2.0 content served to the first end-user is not modified in any way by the second customization.

9. The method of claim 1, wherein the creator established customization is configured to replace a portion of the Web 2.0 content when a Web 2.0 server serves Web content to any of the users in the set of users associated with the customization.

10. The method of claim 1, wherein said Web 2.0 application comprises at least one root entry that comprises an introspection entry and links to an entry collection of at least one entry and a resource collection, wherein the introspection entry, the entry collection, and the resource collection conform to an ATOM PUBLISHING PROTOCOL (APP) based specification.

11. The method of claim 10, wherein end-users are able to add and edit entries in the entry collection and the resource collection.

12. The method of claim 1, wherein the Web 2.0 application is at least one of a WIKI application and a BLOG application served to browsers by at least one of a WIKI server and a BLOG server.

\* \* \* \* \*